United States Patent Office 2,712,502
Patented July 5, 1955

2,712,502

METHOD OF PRODUCING FOOD PRODUCTS FROM COCOANUTS

Ramón Lopez-Irizarry, San Juan, Puerto Rico

No Drawing. Application December 3, 1952, Serial No. 323,940

6 Claims. (Cl. 99—125)

This invention relates to a method of producing food products from cocoanuts, and more particularly to a method of treating the meat and milk of fresh cocoanuts to produce pure food products, and especially to produce a fresh flavored drink extract and a pure fresh oil.

Various methods and processes have been employed to treat the edible portions of the cocoanut to extract the oils therefrom and to produce various food products from the remainder. Usually, the methods are primarily concerned with the oil and the production of a food is secondary, or vice versa. As a result, considerable waste of the secondary product is effected. Moreover, it is extremely difficult, if not impossible, to obtain an absolutely pure fresh oil.

Having in mind the defects of the prior art processes, it is the primary object of the present invention to provide a method of treating the meat and milk of fresh tree ripened cocoanuts to completely utilize the material and to provide pure fresh food products therefrom.

It is another object of the invention to provide a method of treating the milk and meat of fresh tree ripened cocoanuts to produce a flavoring extract that may be employed as a base for beverages as well as other purposes.

It is still another object of the invention to provide a method of treating the meat and milk of fresh tree ripened cocoanuts to produce a pure virgin cocoanut oil.

It is a further object of the invention to provide a method of treating the meat and milk of fresh tree ripened cocoanuts to produce a pure fresh solid food.

It is a still further object of the invention to provide a method of treating the meat and milk of fresh tree ripened cocoanuts to produce a pure fresh flavoring extract, a pure virgin oil and a pure fresh solid food product.

It is yet another object of the invention to provide a method of treating the meat and milk of fresh tree ripened cocoanuts to produce pure fresh food products, which method has simplicity, efficiency and economy.

In carrying out the method of the invention, fresh tree ripened cocoanuts are employed, as hereinbefore stated. When the nuts are opened, the milk, that is, the liquid within the nuts, is collected and is immediately pasteurized to maintain its fresh flavor because this milk starts to ferment as soon as it is exposed to air.

The meat of the nuts is immediately separated from the shells by any convenient method, and this meat is immediately comminuted. Preferably, this meat is finely comminuted in a high speed hammer mill, although a common cocoanut grater may be employed, but this will produce coarse particles which yield a lower extraction of juice.

Immediately upon comminution, the cocoanut meat is imbued with alcohol, or a mixture of alcohol and glycerol, to prevent rancidity and loss or alteration of the natural cocoanut flavor by exposure to the oxygen in the air while the meat is being processed. The alcohol, or alcohol-glycerol mixture, is added to the meat in a proportion of not less than 25% by weight to the weight of the comminuted meat.

The pasteurized cocoanut milk is heated to the boiling point and added while boiling to the comminuted, alcohol imbued cocoanut meat so as to raise the temperature of the meat just enough to facilitate the flowing of the emulsified juices from the meat upon the application of pressure. The boiling milk is added in a proportion by weight of about 50% the original weight of the cocoanut meat under process.

The meat-milk mixture is then subjected, while still hot, to the application of low pressure to extract slowly most of the emulsified juice from the meat along with the milk and the alcohol. This extraction produces a high liquid yield with a very rich fat content.

After the first extraction of the liquid, the meat residue is again heated by the addition of boiling water in an amount substantially equal in volume to the boiling milk that was previously added. The second heating promotes the flowing of additional juice from the meat with soluble carbohydrates and minerals that were not removed by the prior extraction. The meat-water mixture is then subjected to a second extraction at higher pressure.

The liquid obtained from this second extraction is then added to the milk-juice obtained from the first extraction to provide an alcohol containing diluted cocoanut juice emulsion. This emulsion is immediately cooled, preferably by refrigeration, to a sufficiently low temperature and for a sufficient period of time to cause the fat, mixed with some of the protein contents and other insoluble solids, to separate and stratify and preferably to solidify.

The separation of the fat leaves a milky, watery extract having all of its natural delicate cocoanut flavor preserved in alcohol. This extract also contains the soluble carbohydrates and minerals that are natural to cocoanut meat and cocoanut milk.

This milky, watery extract is then removed from the fat and this operation is simplified if the temperature is reduced sufficiently to cause the fat to solidify as the extract may then be poured out, the fat remaining as a solid. The extract is filtered which produces a clear filtrate, which, with the proportions herein specified, contains not over 20% alcohol by volume.

This filtrate constitutes a cocoanut flavoring extract that has many uses. This extract is particularly adapted to be used as a cocoanut base for carbonated beverages and soft drinks, which, in the finished product, shall contain not more than one-half of one per cent by volume of alcohol.

The separated fat and insoluble solids, composed mostly of pure, virgin cocoanut oil with some protein, is then liquified by being raised to a temperature of over 25° C. When liquified, the oil is separated by filtration, and this yields a colorless and almost odorless and tasteless cocoanut oil, free from moisture and containing only traces of free fatty acids.

Additional oil, but of a quality inferior to the original filtrate, may be obtained from the unfiltered portion of the fat and insoluble solids by heating this unfiltered portion sufficiently to coagulate and separate the protein present. The oil is then separated from the protein residue.

The unfiltered protein residue is then added to the meat solids left from the second extraction of the liquid extract. The protein residue improves the condition of the meat solids so that they may be used as a food or ingredient thereof for human consumption.

Thus, it will be seen that the present method eliminates all waste and produces pure, fresh and/or natural tasting food products, namely, a flavoring extract of high quality, pure virgin cocoanut oil, a lower quality of oil, if desired, and a solid food or ingredient.

Although a certain specific embodiment of the invention has been described, it is evident that modifications thereof are possible. The invention, therefore, is not to be restricted except insofar as necessitated by the spirit of the appended claims.

That which is claimed is:

1. The method of producing food products from cocoanuts which comprises collecting the milk from fresh tree ripened cocoanuts and immediately pasteurizing said milk, immediately separating the meat from the shells of said cocoanuts and immediately comminuting said meat, imbuing said meat with alcohol as soon as it is comminuted, raising the temperature of the pasteurized milk to the boiling point and adding the boiling milk to the alcohol imbued meat, subjecting the hot milk and meat mixture to pressure to extract a milk juice emulsion, adding boiling water to the meat solids remaining after said extraction, subjecting the hot water and meat mixture to higher pressure to extract a dilute juice emulsion, combining said emulsions to form a diluted milk juice emulsion, refrigerating said latter emulsion to solidify the fat and thereby separate it from the soluble portions of said emulsion, separating the solidified fat and soluble portions, filtering the soluble portion to produce an alcohol containing cocoanut flavoring extract, heating the fat portions to liquify them, filtering the fat portions to produce a pure cocoanut oil and a protein containing residue, and adding said protein residue to the meat solids left from the second extraction to form a food product.

2. The method of producing food products from cocoanuts which comprises collecting the milk from fresh tree ripened cocoanuts and immediately pasteurizing said milk, immediately separating the meat from the shells of said cocoanuts and immediately comminuting said meat, imbuing said meat with alcohol as soon as it is comminuted, raising the temperature of the pasteurized milk to the boiling point and adding the boiling milk to the alcohol imbued meat, subjecting the hot milk and meat mixture to pressure to extract a milk juice emulsion, adding boiling water to the meat solids remaining from said extraction, subjecting the hot water and meat mixture to higher pressure to extract a dilute juice emulsion, combining said emulsions to form a diluted milk juice emulsion, cooling said latter emulsion to stratify the fat and soluble portions thereof, separating the stratified fat and soluble portions, filtering the soluble portion to produce an alcohol containing cocoanut flavoring extract, filtering the fat portions to produce a pure cocoanut oil, heating the unfiltered portion of said fat to coagulate and separate the protein therein, separating the protein to produce additional cocoanut oil, and adding said protein to the meat solids left from the second extraction to form a food product.

3. The method of producing flavor extract from cocoanuts which comprises collecting the milk from fresh tree ripened cocoanuts and immediately pasteurizing said milk, immediately separating the meat from the shells of said cocoanuts and immediately comminuting said meat, imbuing said meat with alcohol as soon as it is comminuted, raising the temperature of the pasteurized milk to the boiling point and adding the boiling milk to the alcohol imbued meat, subjecting the hot milk and meat mixture to pressure to extract a milk juice emulsion, cooling said emulsion to stratify the fat and soluble portions thereof, separating the stratified fat and soluble portions, and filtering the soluble portion to produce an alcohol containing cocoanut flavoring extract.

4. The method of producing food products from cocoanuts which comprises collecting the milk from fresh tree ripened cocoanuts and immediately pasteurizing said milk, immediately separating the meat from the shells of said cocoanuts and immediately comminuting said meat, immediately imbuing said comminuted meat with alcohol in a proportion by weight of not less than 25% of the weight of the comminuted meat, raising the temperature of the pasteurized milk to the boiling point and adding boiling milk to the alcohol imbued meat in a proportion by weight of about 50% of the original weight of the meat, subjecting the hot milk and meat mixture to pressure to extract a milk juice emulsion, adding boiling water to the meat solids remaining after said extraction in a proportion substantially equal to the boiling milk previously added, subjecting the hot water and meat mixture to higher pressure to extract a dilute juice emulsion, combining said emulsions to form a diluted milk juice emulsion, refrigerating said latter emulsion to solidify the fat and separate it from the soluble portions of said emulsion, separating the solidified fat and soluble portions, filtering the soluble portion to produce an alcohol containing cocoanut flavoring extract, liquifying the fat portions by raising the temperature to above 25° C., and filtering the liquified fat to produce a pure virgin cocoanut oil.

5. The method of producing flavor extract from cocoanuts which comprises collecting the milk from fresh tree ripened cocoanuts and immediately pasteurizing said milk, immediately separating the meat from the shells of said cocoanuts and immediately comminuting said meat, imbuing said meat with alcohol as soon as it is comminuted, raising the temperature of the pasteurized milk to the boiling point and adding the boiling milk to the alcohol imbued meat, subjecting the hot milk and meat mixture to pressure to extract a milk juice emulsion, adding boiling water to the meat solids remaining from said extraction, subjecting the hot water and meat mixture to higher pressure to extract a dilute juice emulsion, combining said emulsions to form a diluted milk juice emulsion, cooling said latter emulsion to stratify the fat and soluble portions thereof, separating the stratified fat and soluble portions, and filtering the soluble portion to produce an alcohol containing cocoanut flavoring extract.

6. The method of producing pure cocoanut oil which comprises comminuting the meat from cocoanuts and immediately imbuing said meat with alcohol as soon as it is comminuted to prevent rancidity, adding a boiling liquid to the alcohol imbued meat to promote flowing of the fat therein, subjecting the liquid and meat mixture to pressure to extract a dilute emulsion, refrigerating said emulsion to solidify the fat in said emulsion, separating the solidified fat from the soluble portions, liquifying the fat by raising the temperature thereof, and filtering the liquified fat to produce a pure virgin cocoanut oil that is colorless and substantially odorless and tasteless.

References Cited in the file of this patent

UNITED STATES PATENTS

| | | |
|---|---|---|
| 1,366,339 | Alexander | Jan. 25, 1921 |
| 1,374,879 | Cookson | Apr. 12, 1921 |
| 1,998,375 | Luque | Apr. 16, 1935 |
| 2,293,848 | Rector | Aug. 25, 1942 |